United States Patent [19]
Das et al.

[11] Patent Number: 4,827,265
[45] Date of Patent: May 2, 1989

[54] COOPERATIVE TRACKING SYSTEM

[75] Inventors: Aniruddha Das, King of Prussia; Victor Navon, Collegeville; Daniel F. Reid, Exton, all of Pa.

[73] Assignee: General Electric Company, Philadelphia, Pa.

[21] Appl. No.: 484,472

[22] Filed: Apr. 13, 1983

[51] Int. Cl.[4] .............................................. G01S 13/00
[52] U.S. Cl. ...................................... 342/78; 342/425
[58] Field of Search ................ 343/7.4, 352, 354, 358, 343/359, 425; 342/78, 425

[56] References Cited

U.S. PATENT DOCUMENTS

| | | | |
|---|---|---|---|
| 2,480,171 | 8/1949 | White | 343/7 |
| 2,537,952 | 1/1951 | Anderson | 343/16 |
| 3,801,979 | 4/1974 | Chisholm | 343/6.5 LC |
| 3,859,658 | 1/1975 | Rabow | 343/7.4 |
| 4,090,201 | 5/1978 | Whitman, Jr. | 343/7.4 |

Primary Examiner—Theodore M. Blum
Attorney, Agent, or Firm—Allen E. Amgott

[57] ABSTRACT

A cooperative antenna tracking system for use at both ends of a radio link employs conical-scanning-type tracking at each end of the radio link to point a directional antenna guided by a continuous radio signal transmitted from an antenna at the other end of the link. A cooperative system between the two stations avoids pollution of the tracking in each station which might be caused by conical scanning at the other end of the link. Tracking pollution is avoided by time multiplexing tracking intervals between the two stations or by employing a tracker drive signal as a reference signal in a synchronous detector in each station to demodulate its own scanning frequency while sharply discriminating against signal variations produced by a scanning frequency at the other end of the link.

8 Claims, 3 Drawing Sheets

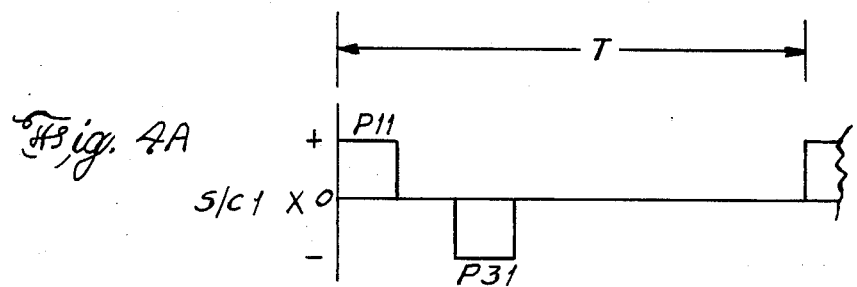
Fig. 4A
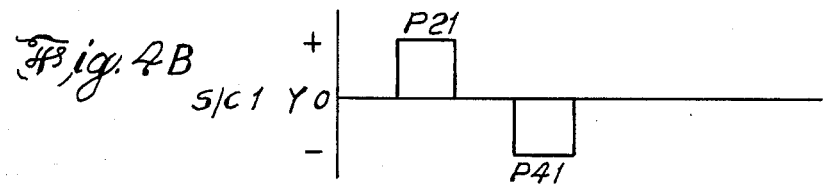
Fig. 4B
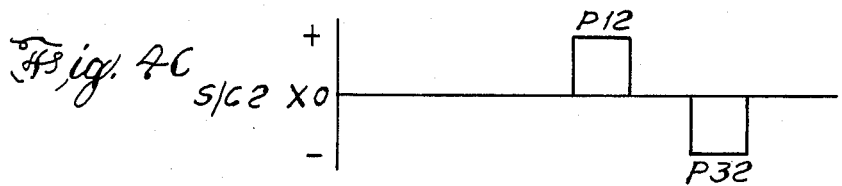
Fig. 4C
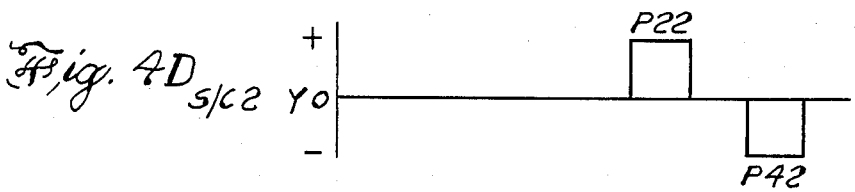
Fig. 4D
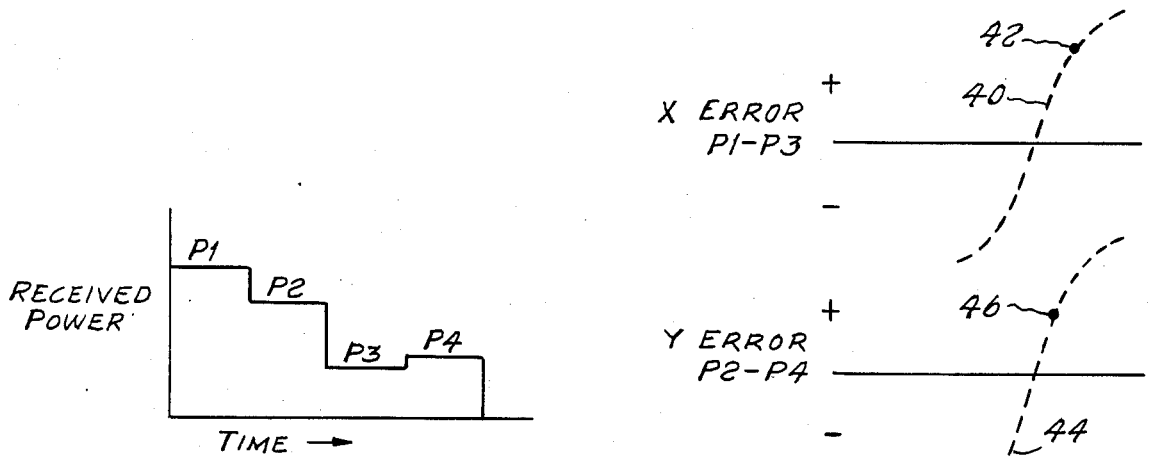
Fig. 5
Fig. 6

COOPERATIVE TRACKING SYSTEM

BACKGROUND OF THE INVENTION

The present invention relates to antenna pointing and tracking systems and, more particularly, to antenna pointing and tracking systems where a station at each end of a two-way radio link is required to track a signal emitted by the station at the other end.

Directional antennas are employed for maximizing the effective radiated power in the desired direction and for minimizing the reception of noise originating in undesired directions. In a two-way communications, link, with each end of the link employing a directional antenna, maximum performance is achieved when the peak of each antenna pattern is centered on the antenna at the other end of the link. In terrestrial applications, where both ends of the link are stationary, pointing of the antennas does not present a difficult problem.

In space applications, the bilateral pointing problem becomes significant. In an earth-satellite-earth communications system, or a satellite-to-satellite communications system, the angular position of the station at each end of the link continuously changes with respect to the station at the other end of the link. Thus, it is desirable to dynamically aim the antennas for centering the beam axis of each on the location of the other.

The principle of reciprocity requires that the radiation patterns for an antenna at a given frequency must be identical for both receiving and transmitting.

In a communications link where transmission is continuous at both ends, and tracking is performed using the power transmitted at the other end, it has been found that conventional conical-scan-type tracking cannot be performed at both ends simultaneously. An attempt to track at both ends is upset by the fact that the received signal at each end is modulated not only by the scanning of its receive beam pattern but also modulated by the scanning of the transmit beam pattern at the other end of the link. This results in hunting at both ends of the link and produces unsatisfactory tracking accuracy.

One skilled in the art would recognize that the principle of reciprocity does not hold precisely true when different transmitting and receiving frequencies are employed in an antenna. However, for the present disclosure, insignificant error will result from assuming identical transmit and receive beam shapes.

In order to solve the bilateral conical scanning problem, prior systems have employed monopulse tracking in which four receive beams, slightly offset from the antenna axis, are processed by separate receivers to yield error signals for tracking. A monopulse system simultaneously processes a single received signal and the hunting problems encountered in conical scanning are avoided. Monopulse systems require large, heavy and expensive antennas and quadruplication of receive channels.

Conical scanning systems per se have long been employed to aim directional antennas. Typically, a conical scanning device employs some means for rotating or nutating a transmitted or received beam in a pattern about the axis of the antenna. If the antenna employs a reflecting dish and a radiator, the pattern can be generated by offsetting the radiator from the reflector axis and rotating either the radiator or the reflector to describe a figure, usually a conical figure, about the axis. Such tracking devices relate the angular position of the beam to the magnitude of the signal level received. The relationship between the received signal and the angular position provides the information for aiming the axis of the antenna.

One type of conical scanning employed in a radar system is disclosed in U.S. Pat. No. 2,480,171.

It is not necessary to process the received signal from the entire conical scan. For example, it may be satisfactory to select samples at specific angular positions for determining the target angle. For example, U.S. Pat. No. 2,537,952 discloses a radar system which produces four transmitted pulses per revolution of the conical scanning device so that it receives one target sample per quadrant. The received signals from opposite quadrants are displayed together to guide antenna steering.

The general principle of the above-cited prior art, although applied to monostatic radar tracking systems, is generally applicable to tracking in a communications link. The problem remains, however, of permitting each end of the link to track the other end with a simpler scanning system than a monopulse system.

OBJECTS AND SUMMARY OF THE INVENTION

Accordingly, it is an object of the invention to provide a cooperative tracking system for antenna steering at both ends of a communications link.

It is a further object of the invention to provide simultaneous antenna tracking and steering at both ends of a communications link without producing hunting due to interaction of received beam motion at one end of the link and transmitted beam motion originating at the other end of the link.

It is a further object of the invention to provide a cooperative tracking system at both ends of a communications link including means for preventing pollution of the tracking signal at one end of the link produced by scanning at the other end of the link.

According to an embodiment of the invention, there is provided a cooperative antenna tracking system for a two-way radio link between first and second stations wherein each of the first and second stations simultaneously transmits and receives, comprising first means for cyclically scanning a first beam axis of a first transmit and receive beam on the first station about a first boresight directed generally toward the second station, second means for cyclically scanning a second beam axis of a second transmit and receive beam on the second station about a second boresight directed generally toward the first station, first tracking means in the first station for tracking a first signal variation of received energy from the second transmit and receive beam produced by scanning the first beam axis, second tracking means in the second station for tracking a second signal variation of received energy from the first transmit and receive beam produced by scanning the second beam axis, and the first and second tracking means including means for preventing pollution of tracking due to scanning by the other thereof.

According to a feature of the invention, there is provided a method for cooperative antenna tracking for a two-way radio link between first and second stations wherein each of the first and second stations simultaneously transmits and receives, comprising cyclically scanning a first beam axis of a first transmit and receive beam on the first station about a first boresight directed generally toward the second station, cyclically scanning a second beam axis of a second transmit and receive beam on the second station about a second boresight directed generally toward the first station, tracking in the first station a first signal variation of received energy from the second transmit and receive beam produced by scanning the first beam axis, tracking in the second station a second signal variation of received energy from the first transmit and receive beam produced by scanning the second beam axis, and preventing pollution of tracking in each of the first and second stations due to beam scanning by the other thereof.

Briefly stated, in accordance with the invention, there is provided a cooperative tracking system for use in a continuously transmitting two-way radio link wherein at least one of the stations is moving and antenna tracking is required by both stations. Tracking employs conical scanning either of the continuous or the step-and-stare type at both ends of the radio link and cooperative techniques are employed to prevent pollution of tracking at one end of the link by scanning at the other end of the link. In one embodiment, scanning is time multiplexed between the two stations with one station scanning while the other one holds boresight and vice versa. In another embodiment, the two scanning frequencies are slightly different and the scan modulation is detected in a synchronous detector employing the output of a scan pattern generator as a detector reference.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 4A through 4D are angular drive sequences employed in two cooperating spacecraft to produce the pointing sequences of FIG. 3.

FIG. 5 is a curve showing the received power levels from a target emitter at each of the scanning positions of FIG. 3.

FIG. 6 shows X error and Y error curves and the error signals derived from the received power levels of FIG. 5.

DETAILED DESCRIPTION OF THE PREFERRED EMBODIMENT

Although the present invention has general applicability to both CW and pulsed-type transmissions, and may also be applicable to any two-way link where it is necessary or desirable for each end of the link to track the other end of the link, for concreteness of description, an illustrative embodiment of the invention is described in connection with a satellite-to-satellite communication link wherein both satellites continuously transmit and receive CW data. The CW data may be of any type such as, for example, frequency shift keying data.

Figure 1:
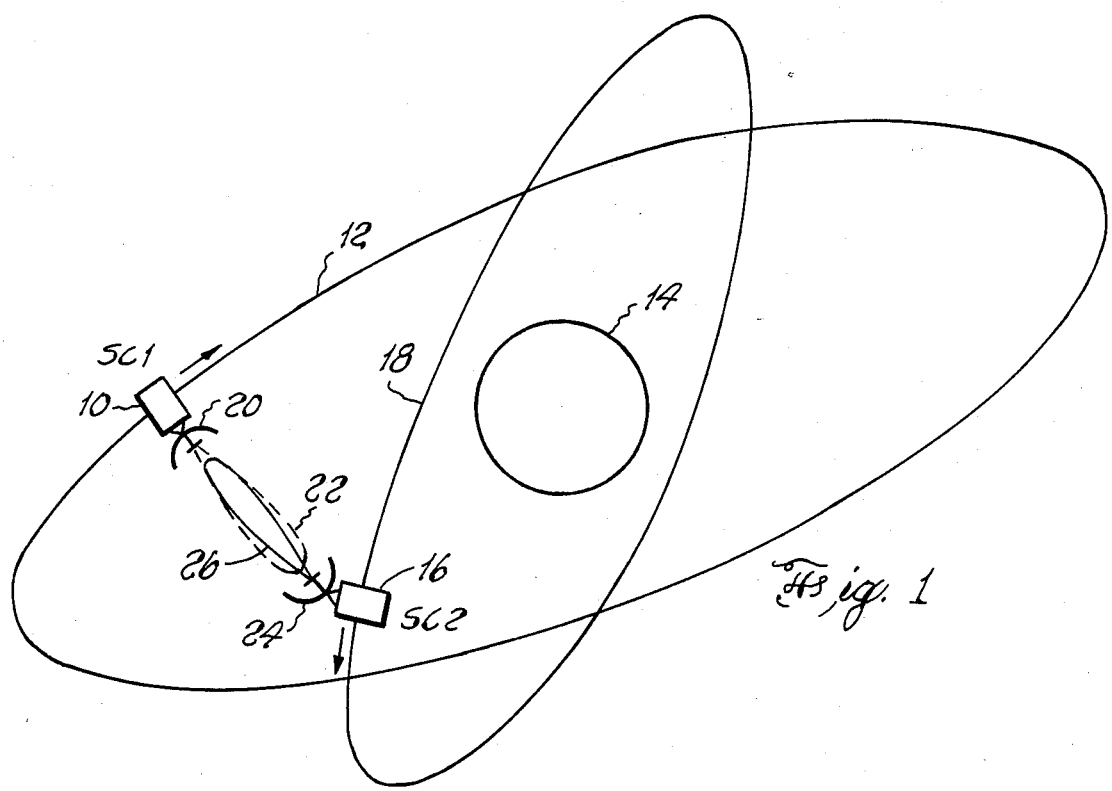
FIG. 1 shows a perspective view of two spacecraft in orbit about the earth each including a directional antenna tracking emissions from the other spacecraft.

Referring now to FIG. 1, there is shown a first spacecraft 10 following an elliptical orbit 12 about a body 14 such as the earth. A second spacecraft 16 follows an elliptical orbit 18 about earth 14. Orbits 12 and 18 are, in general, inclined to each other and have different eccentricities.

First spacecraft 10 includes a directional antenna 20 which has a radiation pattern 22, shown in dashed line, which, according to the principal of reciprocity, must be identical for both receiving and transmitting at a given frequency. Similarly, second spacecraft 16 includes a directional antenna 24 having a radiation pattern 26, shown in solid line, which is also identical for transmitting and receiving. The problem which the present invention seeks to solve is the tracking of emissions from antenna 24 by antenna 20 at the same time that antenna 24 is tracking emissions from antenna 20 using a type of conical scanning or its equivalent, step-and-stare scanning.

Figure 2:
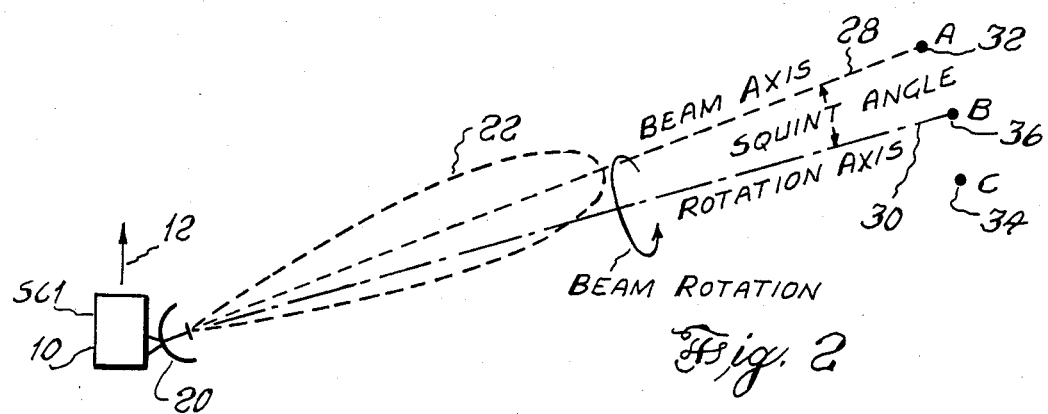
FIG. 2 is a schematic view of a spacecraft and its antenna to which reference will be made in describing conical scanning techniques.

Referring now to FIG. 2, a brief discussion is given of the principle of conical scanning employing first spacecraft 10. A beam axis 28 of radiation pattern 22 is made to rotate about a rotation axis 30. As radiation pattern 22 is rotated about rotation axis 30 in the plane of the figure, beam axis 28 moves between an upper extreme direction aligned with an upper extreme point 32 and a lower extreme direction aligned with a lower extreme point 34. If a CW emitter having a constant effective radiated power in the direction of first spacecraft 10 is located at upper extreme point 32, the output of a receiver in first spacecraft 10 varies cyclically from a maximum when beam axis 28 is aligned with upper extreme point 32 to a minimum when it is aligned with lower extreme point 34. Conversely, if a CW emitter is located at an axial point 36, the output of a receiver in first spacecraft 10 is constant at both extremes of beam axis 28. In the former case when a signal variation is produced by the offset between the emitter and the rotation axis, the relationship between the rotation angle and the receiver output is indicative of the direction and magnitude of the departure of the emitter from rotation axis 30. Typically this information is employed to direct antenna 20 to minimize the signal variation which thus aligns rotation axis 30 with the emitter.

As previously noted, if an emitter at, for example, upper extreme point 32, instead of emitting a constant effective radiated power in the direction of antenna 20, itself rotates its beam about a rotation axis, a receiver in first spacecraft 10 is unable to determine whether the signal variation it senses is due to motion of its own receiving beam or motion of the transmitting beam of the emitter.

The present invention provides two alternative techniques for separating the signal variation due to the scan of the receiving beam from the signal variation due to the scan of the transmitting beam at the other end of the link. In the first technique to be described, the two spacecraft cooperate with each other to time multiplex their scanning functions. In the second technique to be described, conical scanning is continuously performed at both ends of the link but with conical scanning frequencies which differ by at least the bandwidth of the steering system. In this latter technique, synchronous detection of the scan modulation on the received signal is performed using the scan generator signal as a reference. Such synchronous detection acts as an extremely sharp filter favoring signals at the scan frequency and sharply discriminating against signals differing in frequency.

At frequencies which may be encountered in spacecraft applications, beamwidths of between about 0.5 and about 2.5 degrees may be encountered. Prior to initiation of tracking, the antenna boresight of each spacecraft must be roughly pointed at the other spacecraft employing the ephemeris for each spacecraft to position each beam within about a half power beamwidth of the correct angle. That is, if the half power beamwidth of one of the spacecraft beams is 2 degrees, the boresight must be aimed within about 1 degree of the correct angle before tracking can be begun. Such initial accuracies are within the capabilities of conventional aiming techniques.

Figure 3:
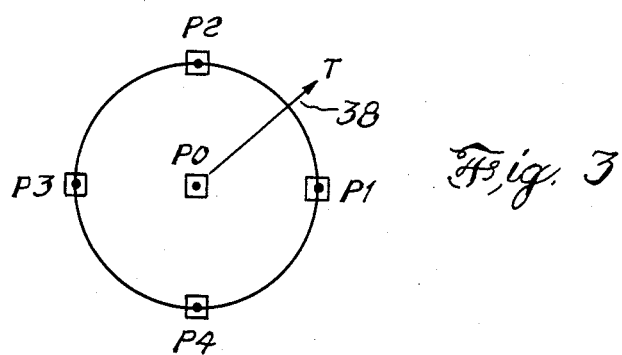
FIG. 3 is a boresight view of an antenna pointing sequence.

Referring now to FIG. 3, a scan pattern is shown which is identical for each of first and second spacecraft 10 and 16. The scan pattern employs a step-and-stare technique wherein the beam axis is directed to four angular positions P1, P2, P3 and P4 in sequence and is then returned to a boresight position P0. It will be recognized that such a step-and-stare technique is analogous to conical scanning. While the beam axis is maintained in the boresight position P0, the other spacecraft goes through its sequence of four positions and then resumes its boresight beam axis while the first spacecraft steps through its four-position sequence and again returns to the boresight.

The step-and-stare scan pattern of FIG. 3 may be accomplished using phase change in a slotted flat plate phased array as well as by using mechanical motion of antenna components.

A complete cooperative series of scans is shown in FIGS. 4A through 4D. Assuming that the positive and negative X axes of the antenna are represented by positions P1 and P3 and the positive and negative Y axes are represented by positions P2 and P4 respectively, the first spacecraft selects position P11, which provides a positive X deflection and a zero Y deflection (FIGS. 4A and 4B) followed by position P21 with zero X and positive Y, followed by position P31 with negative X and zero Y and finally position P41 with zero X and negative Y. Then the first spacecraft antenna assumes the boresight position P01 while the second spacecraft performs a similar sequence (FIGS. 4C and 4D). Referring momentarily to FIG. 3, assume that this is the scan pattern of the first spacecraft performed while the second spacecraft maintains its beam on its boresight from a position T along a radius 38. If the signal level received at each of positions P1, P2, P3 and P4 is stored and the stored signals at opposite positions are differenced, that is, if the differences P1−P3 and P2−P4 are taken, signals representative of the direction and magnitude or the angular displacement of the second spacecraft from the boresight of the first spacecraft along X and Y axes are derived.

The received signals may be as shown in FIG. 5, for example, where the signal received during pointing in the direction P1 is greatest, that in P3 is least and signals received at positions P2 and P4 are intermediate with P2 being greater than P4. When the received powers at positions P1 and P3 are differenced, the result will fall on an S-curve 40 shown in dashed line in FIG. 6. In the present instance, the difference is a positive X error signal 42 since, as indicated in FIG. 5, received power at position P1 exceeds received power at position P3 thus giving a positive X error. Similarly, a Y error S-curve 44 represents the values of the differences P2−P4 and, in the condition shown, the difference produces a positive Y error signal 46. If the X and Y error signals 42 and 46 are employed to drive the boresight axis of the antenna, the pointing error is nulled.

The differencing to produce the error signals in FIG. 6 may be performed by any convenient device such as, for example, capacitor storage, discrete components forming analog or digital computation apparatus. However, in the preferred embodiment, the received power levels are digitized and the differences are produced by a digital processor and most preferably by a digital microprocessor.

Returning momentarily to FIGS. 4A through 4D, it will be noted that the entire scanning sequence of both spacecraft takes place over period T with each spacecraft being allocated half of period T to complete one sequence of scanning positions. By sharing the time for scanning and boresight staring, the tracking performed by each spacecraft is effectively decoupled from pollution due to tracking by the other. It will be noted that each spacecraft selects its time for scanning cooperatively with the other spacecraft so that they are never both scanning at the same time. Time selection may depend on transmitted synchronizing signals, however, in the preferred embodiment, each spacecraft contains an on-board clock whose accuracy is sufficient to maintain synchronism over an extended period of time. Typical spacecraft clock accuracies may be on the order of 30 microseconds per year and are therefore sufficiently accurate to synchronize scanning events on the order of tenths of seconds.

Successful implementation of the cooperative tracking system detailed hereinabove depends on an appropriate relationship between the tracker bandwidth and the pointing bandwidth. The tracker bandwidth is, of course, the inverse of period T consumed by the combined scans of both spacecraft and the pointing bandwidth is the bandwidth of the mechanism driving the antenna axis in response to the tracker errors. As is the case in most tracker problems, the minimum permissible tracker bandwidth depends on the amount of pointing error which is acceptable. The maximum tracker bandwidth is usually limited by economic, space and size constraints imposed by the increase in these factors as tracker rates and accelerations increase. In one embodiment, a period T of about 0.1 seconds was used corresponding to a bandwidth of 10 Hz. For appropriate pointing, a pointing bandwidth 50 times smaller was employed, namely about 0.2 Hz. A ratio of about 50 between these bandwidths is satisfactory to produce adequate tracking accuracy without interaction between the two control loops.

Figure 7:
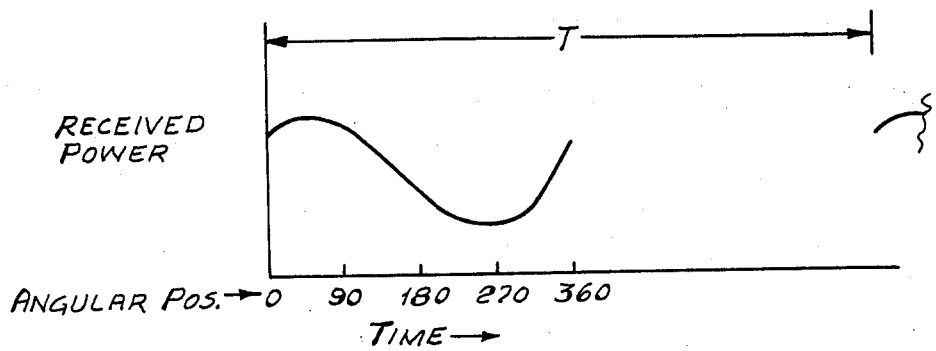
FIG. 7 is a curve showing received power levels corresponding to the stepped power levels of FIG. 5 except for the use of a smooth conical scan.

Referring now to FIG. 7, a plot of received power versus time over a tracker period T is shown where smooth conical scanning is employed. The signal variation during period T of FIG. 7 corresponds generally to the step-and-stare curve of FIG. 5. In the smooth conical scanning system, conventional processing is employed to derive an error signal for pointing the boresight. After one conical scan cycle, the beam in FIG. 7 is held stationary, preferably on boresight, while the other spacecraft performs one conical scan cycle.

Figure 8:
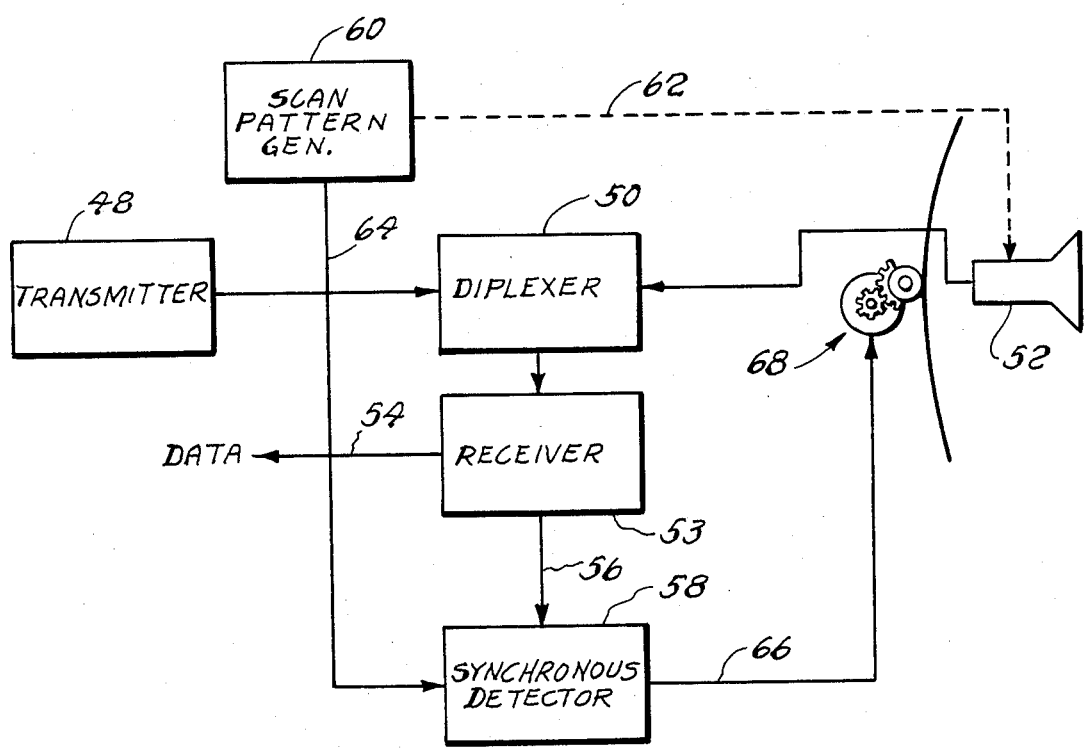
FIG. 8 is a simplified block diagram of a tracking and aiming system employing a synchronous detector which uses a scan pattern signal as a detector reference for separating signal variations due to own antenna motion from signal variations due to antenna motion at the other end of the link.

Referring now to FIG. 8, a block diagram of an embodiment of the invention is shown which permits continuous conical scanning by both spacecraft without pollution of the tracking signal in either spacecraft by the scanning performed at the same time by the other spacecraft. Theoretically, it may be possible to filter the interfering scan pattern frequency of the other spacecraft from the received signal. In order to do this, the scanning frequencies must be far enough separated that real filters can be employed. Conventionally a frequency ratio approaching about two is the minimum required to permit such filtering to succeed. If this technique is employed, one of the spacecraft must have a scanner which is capable of producing a scan pattern at about twice the frequency of the other. With this much difference between scan pattern frequencies, common scanning hardware cannot be used in the two spacecraft. That is, one of the spacecraft must be provided with a larger, more powerful and more costly scanning apparatus than the other. This costs in two ways: (1) the extra cost of the larger and more powerful scanning apparatus and (2) the lack of standardization between the two spacecraft. The embodiment of the invention in FIG. 8 overcomes these problems and effectively isolates the receiving scan frequency from pollution by the transmitting scan frequency.

A transmitter 48 produces a transmitted signal which is applied through a diplexer 50 to an antenna feedhorn 52 which radiates the signal toward the other spacecraft. Antenna feedhorn 52 also receives the signal transmitted from the other spacecraft. The received signal, which is at a sufficiently different radio frequency to be filtered from the transmitted signal in diplexer 50, is applied to a receiver 53. Receiver 53 produces a data output signal on a line 54 which is employed elsewhere in the spacecraft (not shown) and a tracking output on a line 56 which is applied to one input of a synchronous detector 58.

A scan pattern generator 60 produces a mechanical output represented by a dashed line 62 which produces the scanning motion of the beam by, for example, moving antenna feedhorn 52 to produce a conical scan. Scan pattern generator 60 also produces an electrical signal on a line 64 in synchronism with beam scanning which is applied to a second input of synchronous detector 58. Synchronous detector 58 detects the scanning signal on line 56 using the output of scan pattern generator 60 as a reference. This has the effect of an extremely sharp filter centered on the frequency produced by scan pattern generator 60 and is effective to sharply discriminate against all signals different in frequency from the signal produced by scan pattern generator 60. The output of synchronous detector 58 is an error signal which is applied on a line 66 to a conventional antenna steering device 68 which thereupon drives the scanning axis in a direction effective to minimize the error signal.

The inventors have discovered that synchronous detection as disclosed in FIG. 8 is capable of discriminating against interfering frequencies which are relatively close to the frequency produced by scan pattern generator 60. So long as the frequency difference between the scan patterns of the two spacecraft substantially exceeds the bandwidth of the antenna drive mechanism by a suitable factor, synchronous detector 58 is effective to filter out the effect of antenna motion at the opposite end of the radio link. In a system wherein the scanner bandwidth is about 10 Hz and the main drive bandwidth is about 0.2 Hz, a scan frequency difference between the two spacecraft on the order of 1 Hz is satisfactory. That is, approximately a 10 percent difference in scan frequencies under the set of parameters noted is sufficient to decouple the effects of scanning at the opposite end of the radio link. Since the scanning frequency differences can be very small, the same scanning hardware, driven at slightly different speeds may be employable in both spacecraft. This, of course, offers the economy of virtually identical scanning hardware at both ends of the radio link and also avoids the weight, size and cost penalty imposed when one of the spacecraft requires a significantly higher scanning frequency than the other.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A cooperative antenna tracking system for a two-way radio link between first and second stations wherein each of said first and second stations simultaneously transmits and receives, comprising:
   first means for cyclically scanning a first beam axis of a first transmit and receive beam on said first station about a first boresight directed generally toward said second station;
   second means for cyclically scanning a second beam axis of a second transmit and receive beam on said second station about a second boresight directed generally toward said first station;
   first tracking means in said first station for tracking a first signal variation of received energy from said second transmit and receive beam produced by scanning said first beam axis;
   second tracking means in said second station for tracking a second signal variation of received energy from said first transmit and receive beam produced by scanning said second beam axis; and
   said first and second tracking means including means for preventing pollution of tracking due to scanning by the other thereof.

2. A cooperative antenna tracking system according to claim 1 wherein said means for preventing pollution includes means for time multiplexing operation of said first and second means for cyclically scanning, said means for time multiplexing including means for actuating said first means for cyclically scanning while said second means for cyclically scanning is stationary and means for actuating said second means for cyclically scanning while said first means for cyclically scanning is stationary.

3. A cooperative antenna tracking system according to claim 1 wherein said first and second means for cyclically scanning include means effective to produce conical scanning of their respective beam axes.

4. A cooperative antenna tracking system according to claim 1 wherein said first and second means for cyclically scanning include means for stepping their respective beam axes to pluralities of angular positions angularly displaced from said boresights thereof.

5. A cooperative antenna tracking system according to claim 4 wherein said means for stepping further includes means for stepping respective beam axes to angular positions aligned with said boresights.

6. A cooperative antenna tracking system according to claim 5 wherein said means for preventing pollution includes means for alternately stepping said first beam axis to said plurality of angular positions angularly displaced from said first boresight while maintaining said second beam axis aligned with said second boresight and stepping said second beam axis to said plurality of angular positions angularly displaced from said second boresight while maintaining said first beam axis aligned with said first boresight.

7. A cooperative antenna tracking system according to claim 1 wherein said first and second means for scanning include first and second means for continuously conically scanning said first and second beam axes respectively, each of said first and second means for conically scanning being effective to produce a sinusoidal signal synchronized with said scanning, said means for preventing pollution including a synchronous detector effective to synchronously detect scan modulation on a received signal using said sinusoidal signal as a detector reference signal.

8. A method for cooperative antenna tracking for a two-way radio link between first and second stations wherein each of said first and second stations simultaneously transmits and receives, comprising:

cyclically scanning a first beam axis of a first transmit and receive beam on said first station about a first boresight directed generally toward said second station;

cyclically scanning a second beam axis of a second transmit and receive beam on said second station about a second boresight directed generally toward said first station;

tracking in said first station a first signal variation of received energy from said second transmit and receive beam produced by scanning said first beam axis;

tracking in said second station a second signal variation of received energy from said first transmit and receive beam produced by scanning said second beam axis; and preventing pollution of tracking in each of said first and second stations due to beam scanning by the other thereof.

* * * * *